(12) United States Patent
Cline et al.

(10) Patent No.: US 12,318,965 B2
(45) Date of Patent: Jun. 3, 2025

(54) CEMENT SUPPLY CONTROL SYSTEMS AND METHODS

(71) Applicant: Halliburton Energy Services, Inc., Houston, TX (US)

(72) Inventors: Gary Lee Cline, Duncan, OK (US); Charles Edward Neal, III, Duncan, OK (US); James Douglas Funkhouser, Duncan, OK (US); Derek Williams, Duncan, TX (US); Derek James Abel, Duncan, TX (US); Randall Turner Hall, Duncan, TX (US); Chip L. Imel, Edmond, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 742 days.

(21) Appl. No.: 17/579,907

(22) Filed: Jan. 20, 2022

(65) Prior Publication Data

US 2022/0134599 A1    May 5, 2022

Related U.S. Application Data

(62) Division of application No. 15/777,347, filed as application No. PCT/US2015/065663 on Dec. 15, 2015, now Pat. No. 11,260,560.

(51) Int. Cl.
 *B28C 7/00*   (2006.01)
 *B28C 1/00*   (2006.01)
 *B28C 7/04*   (2006.01)
 *B28C 7/06*   (2006.01)
 *G01F 23/284* (2006.01)
 *G01S 13/88*  (2006.01)
 *G01F 23/292* (2006.01)
 *G01F 23/296* (2022.01)

(52) U.S. Cl.
 CPC .............. *B28C 7/0418* (2013.01); *B28C 1/00* (2013.01); *B28C 7/0076* (2013.01); *B28C 7/06* (2013.01); *G01F 23/284* (2013.01); *G01S 13/88* (2013.01); *G01F 23/292* (2013.01); *G01F 23/296* (2013.01)

(58) Field of Classification Search
 CPC .... G01F 23/284; G01F 23/292; G01F 23/296; G01S 13/88; G01N 2035/1025; B28C 7/0418; B28C 7/0076; B28C 1/00
 See application file for complete search history.

(56) References Cited

U.S. PATENT DOCUMENTS

2007/0036898 A1* 2/2007 Hill .................. E04F 21/08
  427/256

* cited by examiner

*Primary Examiner* — Anshu Bhatia
(74) *Attorney, Agent, or Firm* — K&L Gates LLP (57) ABSTRACT

A system comprises a cement mixer, a supply tank to supply dry cement to the cement mixer, and a dry cement height sensor to measure the height of the dry cement in the cement supply tank. A valve controls the flow of dry cement to the cement supply tank based on the signals from the dry cement height sensor. Additional apparatus, methods, and systems are disclosed.

20 Claims, 4 Drawing Sheets

CEMENT SUPPLY CONTROL SYSTEMS AND METHODS

BACKGROUND

As part of some cement mixing operations, a cement supply tank provides dry cement to the cement mixer. In conventional systems of this type, interruptions can occur in the dry cement delivery rate. Sometimes these interruptions can be caused by an insufficient supply of dry cement to the cement supply tank. These interruptions can also be caused by an excessive supply of dry cement to the cement supply tank, such that the supply tank becomes packed off and cement fails to leave the cement supply tank. In such a situation, the cement mixer will sometimes receive periodic slugs of cement, and at other times, no cement at all. Interruptions in the cement delivery rate from the cement supply tank to the cement mixer can result in cement with inconsistent or incorrect density, no cement production at all, or otherwise substandard cement production quality. When cement delivery is inadequate, an operator has to slow down or stop the cement mixing operation until adequate cement delivery resumes. Thus, current systems can result in inefficiencies, substandard cement production quality, damaged equipment, or other costs.

BRIEF DESCRIPTION OF THE DRAWING

The present disclosure may be better understood, and its numerous features and advantages made apparent to those of ordinary skill in the art by referencing the accompanying drawings. The use of the same reference symbols in different drawings indicates similar or identical items.

DETAILED DESCRIPTION

In some embodiments, a cement supply tank control system comprises a cement mixer, a supply tank to supply dry cement to the cement mixer, a dry cement height sensor to measure the height of the dry cement in the cement supply tank, a valve to control the flow of dry cement to the cement supply tank, and a controller to control the valve based on signals from the dry cement height sensor. The cement supply tank control system embodiments described in this document can provide automatic control of the flow of dry cement into the supply tank to maintain a substantially constant height of dry cement in the supply tank. This in turn allows the supply tank to supply a substantially constant delivery rate of dry cement to the cement mixer. These embodiments can help to avoid producing cement with inconsistent or incorrect density, slugs of cement, and packing off, as well as reducing inefficiencies, damage, and other costs associated with substandard cement production, or correcting issues due to inadequate dry cement delivery.

Some conventional systems for controlling cement delivery employ a load cell sensor to determine the weight of the cement in the supply tank. To accurately determine the amount of dry cement in the supply tank based on a scale weight value, the correct absolute density for the cement blend should be known and included in the calculations. Any given job can involve a wide range of material densities. In such systems, an operator must enter a new weight factor for each cement blend that is added to the supply tank in order to calculate the volume of cement in the supply tank based on the measurements of the load cell. This can be tedious and inefficient, and the results are susceptible to human error. In contrast, the cement supply tank control system and methods of the present disclosure directly measure the level of dry cement in the supply tank, allowing for automatic control of the dispensing valve without requiring entry of a weight factor.

Figure 1:
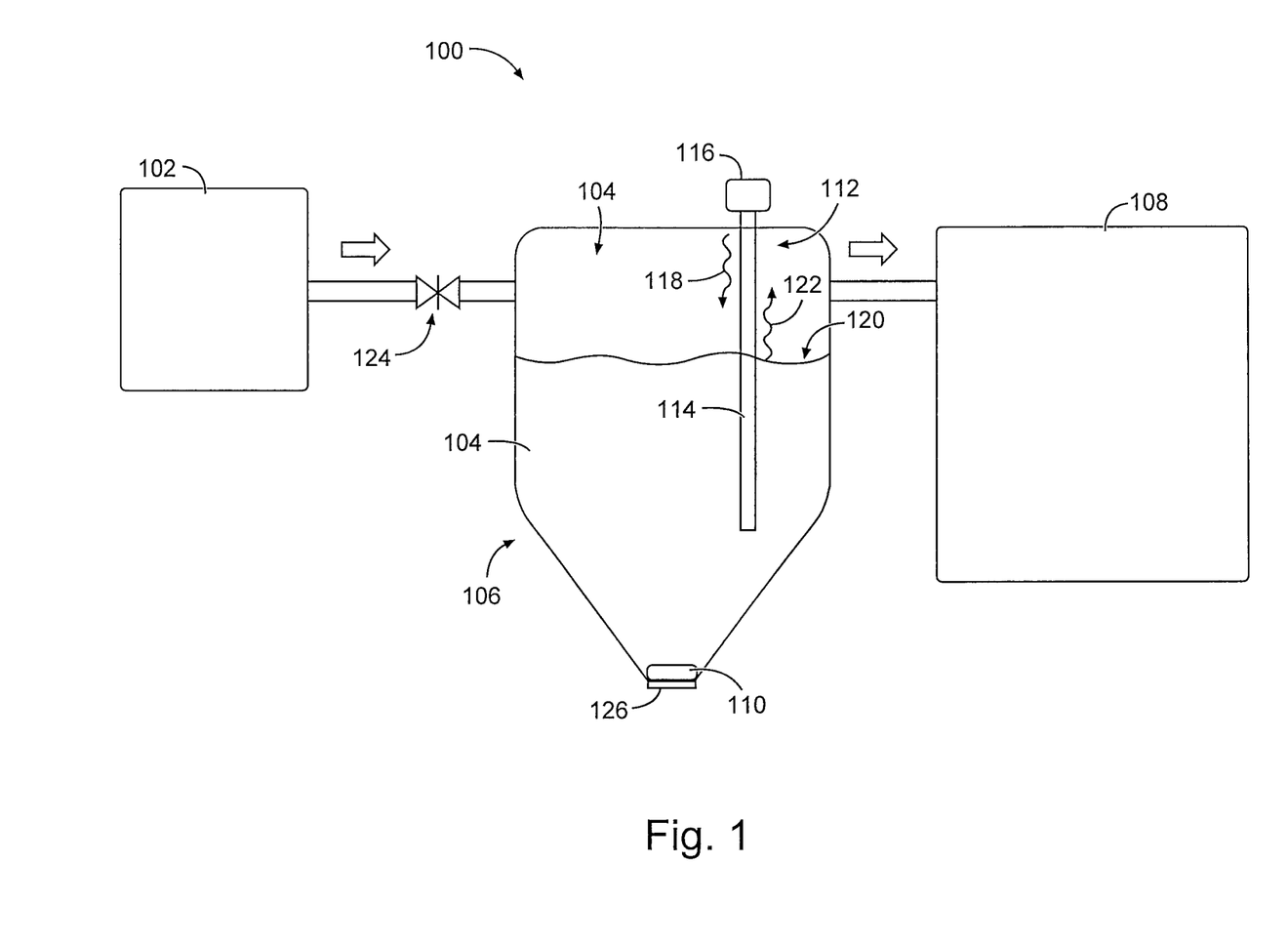
FIG. 1 depicts an example cement supply tank control system, in accordance with some embodiments.

FIG. 1 depicts an example cement supply tank control system 100, in accordance with some embodiments. A bulk cement delivery system 102 delivers dry cement 104 to a cement supply tank 106. The cement supply tank 106 then supplies the dry cement 104 to a cement mixer 108. In at least one embodiment, the cement mixer 108 mixes the dry cement with water or other materials to produce mixed cement. In at least one embodiment, the quality of the mixed cement produced by the cement mixer 108 is dependent on the amount of dry cement 104 in the cement supply tank 106. In some embodiments, an aerator 110 aerates the dry cement 104 in the cement supply tank 106. For example, the aerator 110 can supply air from a location at or near the bottom of the cement supply tank 106. In at least one embodiment, the aerator 110 helps prevent compaction of the dry cement 104 in the cement supply tank 106.

In some embodiments, a dry cement height sensor 112 is positioned in the cement supply tank 106. In at least one embodiment, the dry cement height sensor 112 is configured to measure a height of the dry cement 104 in the cement supply tank 106. In some embodiments the dry cement height sensor 112 may comprise, for example, an acoustic sensor or an optical sensor.

In some embodiments, the dry cement height sensor comprises a radar sensor. Radar sensors are less susceptible to interference due to clouds of dust created by the dry cement 104 than optical or acoustic options. In at least one embodiment, the dry cement height sensor 112 comprises a guided wave radar (GWR) sensor. In some embodiments, the dry cement height sensor 112 comprises a probe 114 and a controller 116. The controller 116, in turn, may comprise an analog computer, a digital computer, or a programmable logic controller (PLC), among other devices.

In some embodiments, the dry cement height sensor 112 uses time domain reflectometry (TDR) to determine the height of the dry cement 104. In at least one embodiment, the dry cement height sensor 112 sends an electromagnetic pulse 118 along the probe 114. When the pulse 118 reaches a surface 120 of the dry cement 104, at least a portion of the electromagnetic energy is reflected back up the probe 114 in a reflected pulse 122. The controller 116 can determine the height of the surface 120 of the dry cement 104 based on the travel times of the pulse 118 and the reflected pulse 122. That is, the time difference between the start of the pulse 118 and the return of the reflected pulse 122 is used to determine the height of the dry cement 104 in the cement supply tank 106.

In some embodiments, a valve 124 controls the flow of dry cement 104 from the bulk cement delivery system 102 to the cement supply tank 106. In at least one embodiment, the valve 124 operates based on signals from the dry cement height sensor 112. In at least one embodiment, the controller 116 controls the operation of the valve 124 based on the measured height of the dry cement 104. In some embodiments, a controller separate from controller 116 operates the valve 124 based on signals from the dry cement height sensor 112. Example operations of the cement supply tank control system 100 are described in greater detail below, with reference to FIGS. 2-4.

In at least one embodiment, the cement supply tank control system 100 additionally includes a weight sensor 126. In such embodiments, the weight sensor 126 is used in combination with the dry cement height sensor 112 to facilitate controlling the level of dry cement 104 in the cement supply tank 106. For example, in at least one embodiment, the weight sensor 126 can be used to verify the measurements of the dry cement height sensor. In at least one embodiment, the weight sensor 126 can be used to determine when the dry cement 104 has become too compacted, to avoid misleading height measurements. That is, the more densely compacted the dry cement 104, the more dry cement 104 can fit in the same volume (and therefore, at a reduced height) of the cement supply tank 106. Thus, in some embodiments, the weight sensor 126 is used to ensure a proper operating range of weights for a given height of dry cement 104.

Figure 2:
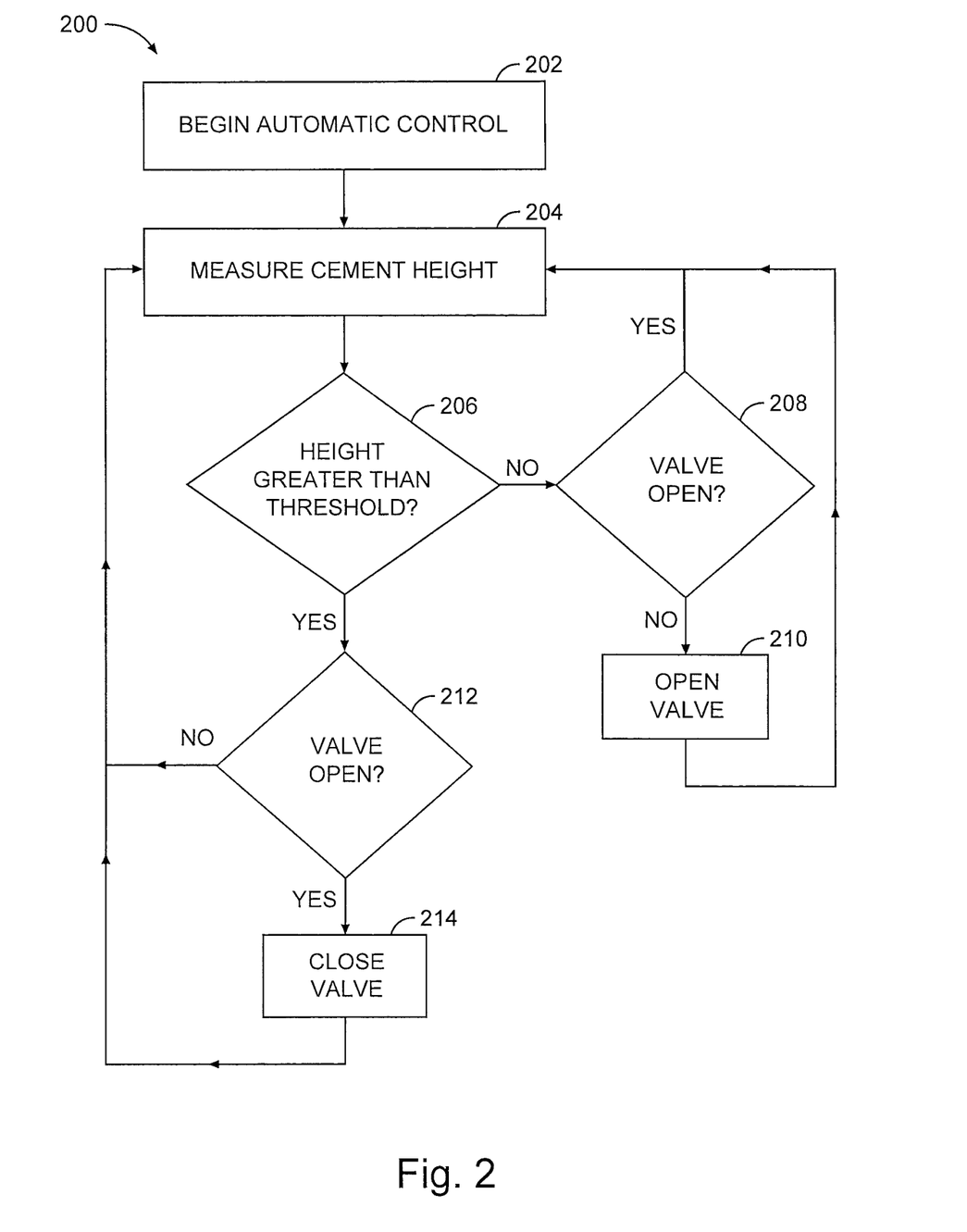
FIG. 2 is a flow diagram of an example method of cement supply tank control, in accordance with some embodiments.

FIG. 2 is a flow diagram of an example method 200 of cement supply tank control, in accordance with some embodiments. As a matter of convenience, the method 200 will be described with reference to the cement supply tank control system 100 of FIG. 1. At block 202, the automatic control begins, for example, by turning on or otherwise initiating the cement supply tank control system 100. In at least one embodiment, the automatic control begins when an initiation command is issued by a computer, which may be remote from the cement mixing apparatus.

At block 204, the dry cement height sensor 112 measures the height of the dry cement 104 in the cement supply tank 106. For example, in at least one embodiment, the dry cement height sensor 112 sends a pulse 118 along a probe 114, and measures the amount of time it takes for the pulse 118 to reach the surface 120 of the dry cement 104 and a reflected pulse 122 (reflected off of the surface 120) to return. The controller 116 can determine the height of the dry cement 104 based on the time measurement of the pulse 118 and the reflected pulse 122. In some embodiments, the dry cement height sensor 112 measures the height of the dry cement 104 in predetermined time increments, such as fractions of a second, or multiples of a second. In some embodiments, the dry cement height sensor 112 measures the height of the dry cement 104 continuously while in operation. Any of a variety of measurement schedules can be implemented for the dry cement height sensor 112.

At block 206, the controller 116 determines whether the measured height of the dry cement 104 is greater than a threshold value. In some embodiments, the threshold value is preprogrammed in the automatic control. In at least one embodiment, a user can enter a threshold value. In some embodiments the threshold value indicates a maximum or minimum height for the dry cement 104 in the cement supply tank 106. In some embodiments the threshold value indicates an average or desired height for the dry cement 104 in the cement supply tank 106. In at least one embodiment, the threshold value can change during a job, perhaps to accommodate a reduced supply rate or a different density of the end product.

If, at block 206, the controller 116 determines that the measured height of the dry cement 104 in the cement supply tank 106 is not greater than the threshold value, then the flow of dry cement 104 to the cement supply tank 106 can be increased. The method 200 proceeds to block 208, at which the controller 116 determines if the valve 124 is open. If the controller 116 determines that the valve 124 is not open, then at block 210, the controller 116 opens the valve 124. In some embodiments, the controller 116 opens the valve 124 to a fully open position from a fully closed position. In some embodiments, the controller 116 opens the valve 124 incrementally, such that the controller 116 has a greater range of control over the flow of dry cement 104 through the valve 124. For example, at block 208, the controller 116 could determine that the valve 124 was not fully open (if it's fully closed or only partially open) and, at block 210, open the valve 124 further, or even completely.

After the controller 116 opens the valve 124 at block 210, the method 200 returns to block 204 to continue monitoring and controlling the level of the dry cement 104 in the cement supply tank 106. If, at block 208, the controller 116 determines that the valve 124 is already open (fully), then the method 200 returns to block 204 to continue monitoring and controlling the level of the dry cement 104 in the cement supply tank 106.

If, at block 206, the controller 116 determines that the height of the dry cement 104 in the cement supply tank 106 is greater than the threshold value, then the flow of dry cement 104 to the cement supply tank 106 can be decreased. The method 200 proceeds to block 212, at which the controller 116 determines if the valve 124 is open. If the controller 116 determines that the valve 124 is open, then at block 214, the controller 116 closes the valve 124. In some embodiments, the controller 116 closes the valve 124 to a fully closed position from a fully open position. In some embodiments, the controller 116 closes the valve 124 incrementally, such that the controller 116 has a greater range of control over the flow of dry cement 104 through the valve 124. For example, at block 212, the controller 116 could determine that the valve 124 was not fully closed (if it's partially or fully open) and, at block 214, close the valve 124 further, or even completely.

After the controller 116 closes the valve 124 at block 214, the method 200 returns to block 204 to continue monitoring and controlling the level of the dry cement 104 in the cement supply tank 106. If, at block 212, the controller 116 determines that the valve 124 is already closed (fully), then the method 200 returns to block 204 to continue monitoring and controlling the level of the dry cement 104 in the cement supply tank 106.

The method 200 allows the cement supply tank control system 100 to maintain a sufficient amount of dry cement 104 in the supply tank 106 based on a comparison of the measured height of the surface 120 of the dry cement 104 in the cement supply tank 106 and a desired threshold value. In at least one embodiment the threshold value is selected based on a height or volume of dry cement 104 associated with a sufficient level of dry cement 104 in the cement supply tank 106 for producing a desired mixed cement quality or density in the cement mixer 108.

Figure 3:
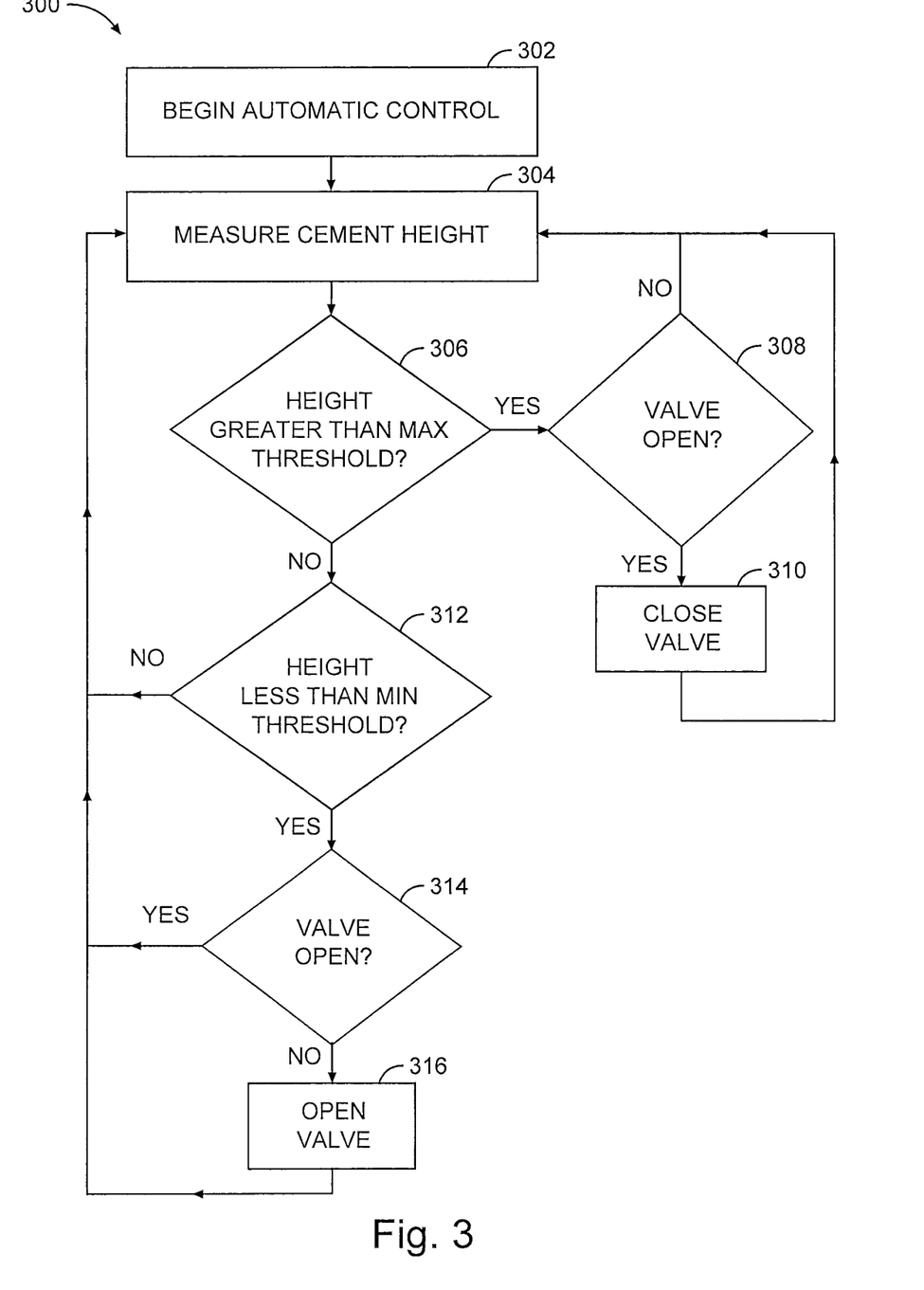
FIG. 3 is a flow diagram of an example method of cement supply tank control, in accordance with some embodiments.

FIG. 3 is a flow diagram of an example method 300 of cement supply tank control, in accordance with some embodiments. As a matter of convenience, the method 300 will be described with reference to the cement supply tank control system 100 of FIG. 1. At block 302, the automatic control begins, for example, by turning on or otherwise initiating operation of the cement supply tank control system 100. In at least one embodiment, the automatic control begins by an operator initiating a command at a computer, which may be remote.

At block 304, the dry cement height sensor 112 measures the height of the dry cement 104 in the cement supply tank 106. For example, in at least one embodiment, the dry cement height sensor 112 sends a pulse 118 along a probe 114, and measures the amount of time it takes for the pulse 118 to reach the surface 120 of the dry cement 104 and a reflected pulse 122 (reflected off of the surface 120) to return. The controller 116 can determine the height of the dry cement 104 based on the time measurement of the pulse 118 and the reflected pulse 122. In some embodiments, the dry cement height sensor 112 measures the height of the dry cement 104 in predetermined time increments. In some embodiments, the dry cement height sensor 112 measures the height of the dry cement 104 continuously while in operation. Any of a variety of measurement schedules can be implemented for the dry cement height sensor 112.

At block 306, the controller 116 determines whether the measured height of the dry cement 104 is greater than a maximum threshold value. In some embodiments, the maximum threshold value is preprogrammed in the automatic control. In at least one embodiment, a user can enter a maximum threshold value. The maximum threshold value generally indicates a maximum desired height for the dry cement 104 in the cement supply tank 106. In at least one embodiment, the maximum threshold value can change during a job.

If, at block 306, the controller 116 determines that the height of the dry cement 104 in the cement supply tank 106 is greater than the maximum threshold value, then the flow of dry cement 104 to the cement supply tank 106 can be decreased. The method 300 proceeds to block 308, at which the controller 116 determines if the valve 124 is open. If the controller 116 determines that the valve 124 is open, then at block 310, the controller 116 closes the valve 124. In some embodiments, the controller 116 closes the valve 124 to a fully closed position from a fully open position. In some embodiments, the controller 116 closes the valve 124 incrementally, such that the controller 116 has a greater range of control over the flow of dry cement 104 through the valve 124. For example, at block 308, the controller 116 could determine that the valve 124 was not fully closed (if it's fully or partially open) and, at block 310, close the valve 124 further, or even completely.

After the controller 116 closes the valve 124 at block 310, the method 300 returns to block 304 to continue monitoring and controlling the level of the dry cement 104 in the cement supply tank 106. If, at block 308, the controller 116 determines that the valve 124 is already closed (fully), then the method 300 returns to block 304 to continue monitoring and controlling the level of the dry cement 104 in the cement supply tank 106.

If, at block 306, the controller 116 determines that the height of the dry cement 104 in the cement supply tank 106 is not greater than the maximum threshold value, then the method 300 proceeds to block 312, at which the controller 116 determines whether the measured height is less than a minimum threshold value. In some embodiments, the minimum threshold value is preprogrammed in the automatic control. In at least one embodiment, a user can enter a minimum threshold value. The minimum threshold value generally indicates a minimum desired height for the dry cement 104 in the cement supply tank 106. In at least one embodiment, the minimum threshold value can change during a job.

If, at block 312, the controller 116 determines that the height of the dry cement 104 in the cement supply tank 106 is less than the minimum threshold value, then the flow of dry cement 104 to the cement supply tank 106 can be increased. The method 300 proceeds to block 214, at which the controller 116 determines if the valve 124 is open. If the controller 116 determines that the valve 124 is not open, then at block 316, the controller 116 opens the valve 124. In some embodiments, the controller 116 opens the valve 124 to a fully open position from a fully closed position. In some embodiments, the controller 116 opens the valve 124 incrementally, such that the controller 116 has a greater range of control over the flow of dry cement 104 through the valve 124. For example, at block 314, the controller 116 could determine that the valve 124 was not fully open (if it's fully closed or only partially open) and at block 316 open the valve 124 further, or even completely.

After the controller 116 opens the valve 124 at block 316, the method 300 returns to block 304 to continue monitoring and controlling the level of the dry cement 104 in the cement supply tank 106. If, at block 314, the controller 116 determines that the valve 124 is already open (fully), then the method 300 returns to block 304 to continue monitoring and controlling the level of the dry cement 104 in the cement supply tank 106. If, at block 312, the controller 116 determines that the height of the dry cement 104 in the cement supply tank 106 is not less than the minimum threshold value, then the method 300 returns to block 304 to continue monitoring and controlling the level of the dry cement 104 in the cement supply tank 106.

The method 300 allows the cement supply tank control system 100 to maintain a sufficient amount of dry cement 104 in the supply tank 106 based on a comparison of the measured height of the surface 120 of the dry cement 104 in the cement supply tank 106 and a desired height range. In at least one embodiment, the minimum and maximum threshold values are selected to indicate a range of sufficient heights (or volumes) of dry cement 104 associated with a sufficient level of dry cement 104 in the cement supply tank 106 for producing a desired mixed cement quality or density in the cement mixer 108.

Figure 4:
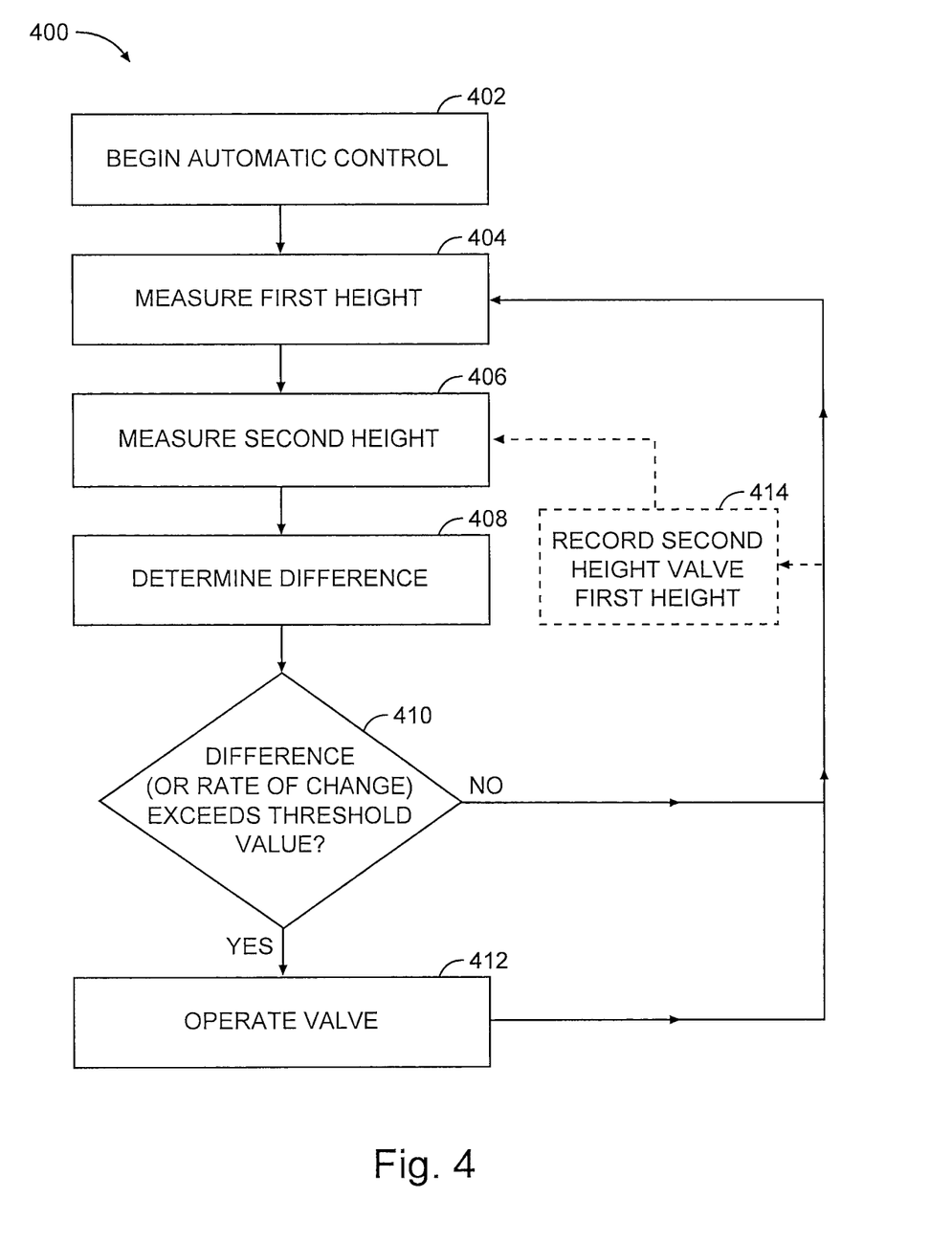
FIG. 4 is a flow diagram of an example method of cement supply tank control, in accordance with some embodiments.

FIG. 4 is a flow diagram of an example method 400 of cement supply tank control, in accordance with some embodiments. As a matter of convenience, the method 200 will be described with reference to the cement supply tank control system 400 of FIG. 1 At block 402, the automatic control begins, for example, by turning on or otherwise initiating operation of the cement supply tank control system 100. In at least one embodiment, the automatic control begins when an initiation command is issued by a computer, which may be remote from the cement mixing apparatus.

At block 404, the dry cement height sensor 112 measures the height of the dry cement 104 in the cement supply tank 106 and records the height as a first height measurement. At block 406, the dry cement height sensor 112 again measures the height of the dry cement 104 in the cement supply tank 106 and records the height as a second height measurement. In at least one embodiment, the dry cement height sensor 112 measures each of the first and second heights by sending a pulse 118 along a probe 114, and measuring the amount of time it takes for the pulse 118 to reach the surface 120 of the dry cement 104 and a reflected pulse 122 (reflected off of the surface 120) to return. The controller 116 can determine the height of the dry cement 104 based on the time measurement of the pulse 118 and the reflected pulse 122. In some embodiments, the dry cement height sensor 112 measures the first and second heights of the dry cement 104 in predetermined time increments. In some embodiments, the dry cement height sensor 112 measures the height of the dry cement 104 continuously while in operation. Any of a variety of measurement schedules can be implemented for the dry cement height sensor 112.

At block 408, the controller 116 determines the difference between the first height measurement and the second height measurement. The difference between the height values can represent a change in volume of the dry cement 104 in the cement supply tank 106. Further, this change in height or volume can be measured relative to time by recording the time difference between the first and second height measurements.

At block 410, the controller 116 determines whether the difference between the first height measurement and the second height measurement exceeds a threshold value. In some embodiments, the threshold value is preprogrammed in the automatic control. In at least one embodiment, a user can enter a threshold value. In some embodiments the threshold value received by the system indicates a maximum or minimum change (or rate of change) in height for the dry cement 104 in the cement supply tank 106. In some embodiments the threshold value indicates an average or desired change (or rate of change) in height for the dry cement 104 in the cement supply tank 106. In at least one embodiment, the threshold value can change during a job. In some embodiments, a maximum and minimum threshold value can be determined, similar to the process for analyzing the maximum and minimum thresholds described with reference to FIG. 3.

If, at block 410, the controller 116 determines that the difference between the first and second measured heights of the dry cement 104 in the cement supply tank 106 (or the rate of change) is not greater than the threshold value, then the flow rate of dry cement 104 to the cement supply tank 106 does not need to be changed, and the method 400 returns to block 404. If, at block 410, the controller 116 determines that the change (difference) in height (or the rate of change) exceeds the threshold value, then the method 400 proceeds to block 412.

At block 412, the controller 116 operates the valve 124. For example, if the threshold value is a maximum value, and the change in height (or rate of change) exceeds the maximum threshold value, then at block 412, the controller 116 closes the valve 124. In some embodiments, the controller 116 closes the valve 124 to a fully closed position from a fully open position. In some embodiments, the controller 116 closes the valve 124 incrementally, such that the controller 116 has greater control over the flow of dry cement 104 through the valve 124. For example, the controller 116 could partially close the valve to decrease the flow of dry cement 104 into the cement supply tank 106 without stopping the flow altogether.

If the threshold value is a minimum value, and the change in height (or rate of change) exceeds the minimum threshold value, then at block 412, the controller 116 opens the valve 124. In some embodiments, the controller 116 opens the valve 124 to a fully open position from a fully closed position. In some embodiments, the controller 116 opens the valve 124 incrementally, such that the controller 116 has greater control over the flow of dry cement 104 through the valve 124. For example, the controller 116 could partially open the valve 124 to increase the flow of dry cement 104 into the cement supply tank 106 without maximizing the flow through the valve 124.

After the controller 116 operates the valve 124 at block 412, the method 400 returns to block 404 to continue monitoring and controlling the level of the dry cement 104 in the cement supply tank 106. In at least one embodiment, instead of returning to block 404 after blocks 410 and 412, the method 400 proceeds to block 414. At block 414, the controller 116 records the second height measurement value as a first height, such that instead of taking two height measurements before determining a difference, only one additional measurement is needed. As such, from block 414, the method 400 returns to block 406 to measure a (new) second height of the dry cement 104 in the cement supply tank 106. Then, at block 408, the controller 116 would determine the difference between the new first height (previous second height measurement) and new second height.

The method 400 allows the cement supply tank control system 100 to maintain a sufficient amount of dry cement 104 in the supply tank 106 by monitoring the rate of change of the dry cement 104 in the cement supply tank 106 (or the change in height of the dry cement 104 measured at known intervals). The change (or rate of change) is then compared to a threshold value. In at least one embodiment, the threshold value is selected based on a rate of change associated with a sufficient level of dry cement 104 in the cement supply tank 106 for producing desired mixed cement quality in the cement mixer 108.

In some embodiments, rather than each of the methods 200, 300, 400 running in a continuous loop, in some embodiments, the system 100 determines if more cement is needed before proceeding. If more mixed cement is needed, the method 200, 300, 400 proceeds through the steps to operate the valve 124. If, however, no additional mixed cement is needed, then the system 100 ends. In at least one embodiment, the system 100 closes the valve 124 and ends in response to a determination that no additional mixed cement is needed. This decision can be made immediately after initiating automatic control, at the end of each loop before starting a new loop, or anywhere in the method 200, 300, 400. The end of the job (and therefore whether more mixed cement is needed) can be determined by visual observation, using a camera at a desired location, by contact measurement with the mixed cement at the delivery location, and other ways known to those of ordinary skill in the art.

Some embodiments may combine one or more features of methods 200-400, described with reference to FIGS. 2-4. For example, in at least one embodiment, the cement supply tank control system 100 employs threshold values associated with a maximum and minimum height, as well as threshold values related to the rate of change of the height of dry cement 104 in the cement supply tank 106.

Thus, many embodiments may be realized. Some of these will now be listed as non-limiting examples.

In some embodiments, a system comprises a cement mixer, a cement supply tank to supply dry cement to the cement mixer, and a dry cement height sensor to measure the height of the dry cement in the cement supply tank.

In some embodiments, the sensor comprises a radar height sensor.

In some embodiment, the system further comprises a valve to control the flow of dry cement to the cement supply tank.

In some embodiments, the system further comprises a controller to open and close the valve based on signals from the dry cement height sensor.

In some embodiments, the system further comprises a control system to automatically control the flow of dry cement to the cement supply tank based on signals from the dry cement height sensor.

In some embodiments, a method comprises measuring, via a dry cement height sensor, a first height of the dry cement in a cement supply tank, and controlling a rate of delivery of additional dry cement to the cement supply tank based on the first height.

In some embodiments, controlling the rate of delivery of the additional dry cement to the cement supply tank based on the first height comprises operating a valve responsive to the first height being greater than a threshold height.

In some embodiments, operating the valve comprises decreasing the rate of delivery of additional dry cement to the cement supply tank.

In some embodiments, controlling the rate of delivery of dry cement to the cement supply tank based on the first height comprises operating a valve responsive to the first height being less than a first threshold height.

In some embodiments, operating the valve comprises increasing the rate of delivery of additional dry cement to the cement supply tank.

In some embodiments, the method further comprises measuring, via the dry cement height sensor a second height of the dry cement in the cement supply tank, and operating the valve responsive to the second height being greater than the first threshold height.

In some embodiments, the method further comprises measuring, via the dry cement height sensor, a second height of the dry cement in the cement supply tank, and operating the valve responsive to the second height being greater than a second threshold height which is greater than the first threshold height.

In some embodiments, the method further comprises measuring, via the dry cement height sensor, a second height of the dry cement in the cement supply tank, determining a difference between the first and second heights, and controlling the rate of delivery of additional dry cement to the cement supply tank based on the difference between the first and second heights.

In some embodiments, controlling the rate of delivery of dry cement to the cement supply tank comprises operating a valve responsive to the difference between the first and second heights exceeding a threshold value.

In some embodiments, controlling the rate of delivery of dry cement to the cement supply tank comprises operating a valve responsive to the difference between the first and second heights meeting a threshold value.

In some embodiments, the method further comprises delivering the dry cement from the dry cement tank to a cement mixer at a substantially constant rate.

In some embodiments, a system comprises a cement supply tank, a dry cement height sensor to measure the height of the dry cement in the cement supply tank, a bulk cement delivery system to provide the dry cement to the cement supply tank, and a valve to control the flow of the dry cement from the bulk cement delivery system to the cement supply tank.

In some embodiments, the sensor comprises a guided wave radar height sensor.

In some embodiments, the system further comprises a controller to control the valve based on measurements made by the dry cement height sensor.

In some embodiments, the system further comprises an aerator to aerate the dry cement in the cement supply tank.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

The invention claimed is:

1. A method, comprising:
    measuring, via a single dry cement height sensor, a height of only dry cement in a cement supply tank all along a range of heights;
    setting a threshold height at any point along the range of heights; and
    controlling a flow of only additional dry cement to the cement supply tank based on the measurement of the height relative to the threshold height.

2. The method of claim 1, wherein controlling flow of additional dry cement to the cement supply tank comprises operating a valve responsive to the height of the dry cement being greater than the threshold height.

3. The method of claim 2, wherein operating the valve comprises decreasing the flow of additional dry cement to the cement supply tank.

4. The method of claim 1, wherein controlling flow of additional dry cement to the cement supply tank comprises operating a valve responsive to the height of the dry cement being less than the threshold height.

5. The method of claim 4, wherein operating the valve comprises increasing the flow of additional dry cement to the cement supply tank.

6. The method of claim 1, further comprising changing the threshold height during a job.

7. A method, comprising:
    measuring, via a single dry cement height sensor, a height of only dry cement in a cement supply tank all along a range of heights;

setting a maximum threshold height at any point along the range of heights;

setting a minimum threshold height at any point along the range of heights lower than the first threshold height; and controlling a flow of only additional dry cement to the cement supply tank based on the measurement of the height relative to the maximum and minimum threshold heights.

8. The method of claim 7, wherein controlling flow of additional dry cement to the cement supply tank comprises operating a valve responsive to the height of the dry cement being greater than the maximum threshold height.

9. The method of claim 8, wherein operating the valve comprises decreasing the flow of additional dry cement to the cement supply tank.

10. The method of claim 7, wherein controlling flow of additional dry cement to the cement supply tank comprises operating a valve responsive to the first height of the dry cement being less than the minimum threshold height.

11. The method of claim 10, wherein operating the valve comprises increasing the flow of additional dry cement to the cement supply tank.

12. The method of claim 7, further comprising changing at least one of the maximum threshold height or the minimum threshold height during a job.

13. A method, comprising:

measuring, via a single dry cement height sensor, a first height of only dry cement in a cement supply tank all along a range of heights;

measuring, via the single dry cement height sensor, a second height of only dry cement in the cement supply tank all along the range of heights;

determining a difference between the first and second heights; and controlling the flow of only additional dry cement to the cement supply tank based on whether the difference between the first and second heights exceeds a threshold value.

14. The method of claim 13, wherein controlling the flow of dry cement to the cement supply tank comprises not changing the flow responsive to the difference between the first and second heights not exceeding the threshold value.

15. The method of claim 13, wherein controlling the flow of dry cement to the cement supply tank comprises operating a valve responsive to the difference between the first and second heights exceeding the threshold value.

16. The method of claim 15, wherein the threshold value comprises a maximum value and operating the valve comprises decreasing the flow of additional dry cement to the cement supply tank.

17. The method of claim 15, wherein the threshold value comprises a minimum value and operating the valve comprises increasing the flow of additional dry cement to the cement supply tank.

18. The method of claim 13, wherein the threshold value comprises an average or desired change in height for the dry cement in the cement supply tank.

19. The method of claim 13, wherein the threshold value comprises an average or desired rate of change in height for the dry cement in the cement supply tank.

20. The method of claim 13, further comprising changing the threshold value during a job.

* * * * *